(12) United States Patent
Toyoshima et al.

(10) Patent No.: US 9,134,472 B2
(45) Date of Patent: Sep. 15, 2015

(54) DEFLECTING PLATE AND LIQUID CRYSTAL DISPLAY DEVICE

(71) Applicant: ZEON CORPORATION, Chiyoda-ku, Tokyo (JP)

(72) Inventors: Tetsuya Toyoshima, Tokyo (JP); Kouhei Arakawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 13/968,309

(22) Filed: Aug. 15, 2013

(65) Prior Publication Data

US 2013/0329170 A1    Dec. 12, 2013

Related U.S. Application Data

(62) Division of application No. 11/667,275, filed as application No. PCT/JP2005/020453 on Nov. 8, 2005, now Pat. No. 8,537,309.

(30) Foreign Application Priority Data

Nov. 9, 2004  (JP) .................................. 2004-324547

(51) Int. Cl.
*G02F 1/1335* (2006.01)
*G02B 5/30* (2006.01)
*G02B 1/10* (2015.01)

(52) U.S. Cl.
CPC .............. *G02B 5/3083* (2013.01); *G02B 1/105* (2013.01); *G02B 5/305* (2013.01); *G02F 1/133502* (2013.01); *G02F 1/133528* (2013.01); *B32B 2457/20* (2013.01)

(58) Field of Classification Search
None
See application file for complete search history.

(56) References Cited

U.S. PATENT DOCUMENTS

| 4,080,491 A | 3/1978 | Kobayashi et al. |
| 4,292,370 A | 9/1981 | Pekko |

(Continued)

FOREIGN PATENT DOCUMENTS

| JP | 7-77608 A | 3/1995 |
| JP | 8-43812 A | 2/1996 |

(Continued)

OTHER PUBLICATIONS

Extended European Search Report dated May 7, 2010 for corresponding European Application No. 05803018.0.

(Continued)

*Primary Examiner* — Mark Robinson
*Assistant Examiner* — Erin Chiem
(74) *Attorney, Agent, or Firm* — Birch, Stewart, Kolasch & Birch, LLP

(57) ABSTRACT

The present invention provides a polarizer plate including at least a protective layer A, a polarizer, and a protective layer B in that order, the protective layer A including at least layers a and b respectively including a thermoplastic resin as a main component, the layer a having a flexural modulus higher than that of the layer b; and a liquid crystal display device including a light source, an incident-side polarizer plate, a liquid crystal cell, and an exit-side polarizer plate in that order, the incident-side polarizer plate and/or the exit-side polarizer plate being the polarizer plate of the present invention. According to the present invention, a polarizer plate exhibiting high tenacity and high surface hardness and a liquid crystal display device including the polarizer plate are provided.

14 Claims, 4 Drawing Sheets

(56) References Cited

U.S. PATENT DOCUMENTS

| | | |
|---|---|---|
| 6,224,976 B1 | 5/2001 | Takushima et al. |
| 6,262,787 B1 | 7/2001 | Kamoi et al. |
| 6,329,047 B1 | 12/2001 | Beer et al. |
| 6,391,400 B1 | 5/2002 | Russell et al. |
| 6,502,943 B2 | 1/2003 | Nakamura et al. |
| 6,521,312 B1 | 2/2003 | Keiser |
| 6,558,804 B2 | 5/2003 | Sato et al. |
| 6,600,529 B1 | 7/2003 | Kusumoto et al. |
| 6,692,821 B2 | 2/2004 | Koyama et al. |
| 6,713,170 B1 | 3/2004 | Kaneko et al. |
| 6,844,403 B2 | 1/2005 | Oshima et al. |
| 6,961,178 B2 | 11/2005 | Sugino et al. |
| 7,179,529 B2 | 2/2007 | Mizuno et al. |
| 7,405,008 B2 | 7/2008 | Domine et al. |
| 7,479,327 B2 | 1/2009 | Domine |
| 2002/0005925 A1 | 1/2002 | Arakawa |
| 2002/0136853 A1 | 9/2002 | Koyama et al. |
| 2002/0149726 A1 | 10/2002 | Yano et al. |
| 2002/0176973 A1 | 11/2002 | Keiser |
| 2003/0054187 A1 | 3/2003 | Higashi et al. |
| 2003/0118753 A1 | 6/2003 | Gamble et al. |
| 2004/0085493 A1 | 5/2004 | Sa et al. |
| 2004/0223220 A1 | 11/2004 | Kawanishi et al. |
| 2004/0240070 A1 | 12/2004 | Suzuki et al. |
| 2005/0206817 A1 | 9/2005 | Kajita et al. |
| 2007/0285777 A1 | 12/2007 | Toyoshima et al. |
| 2008/0032146 A1 | 2/2008 | Toyoshima et al. |

FOREIGN PATENT DOCUMENTS

| | | |
|---|---|---|
| JP | 8-338912 A | 12/1996 |
| JP | 9-197128 A | 7/1997 |
| JP | 2000-206303 A | 7/2000 |
| JP | 2001-272535 A | 10/2001 |
| JP | 2001-322216 A | 11/2001 |
| JP | 2002-249600 A | 9/2002 |
| JP | 2002-292808 A | 10/2002 |
| JP | 2002-303726 A | 10/2002 |
| JP | 2003-57439 A | 2/2003 |
| JP | 2003-344608 A | 12/2003 |
| JP | 2004-53801 A | 2/2004 |
| JP | 2004-053801 A | 2/2004 |
| JP | 2004-126546 A | 4/2004 |
| JP | 2004-226799 A | 8/2004 |
| JP | 2004-252263 A | 9/2004 |

OTHER PUBLICATIONS

Mujika et al., Flexure Tests for Determining Tensile and Compressive Modulus, 2004, University of the Basque Country.

US Office Action, dated Aug. 21, 2009, for U.S. Appl. No. 11/667,274.

US Office Action, dated Dec. 15, 2008, for U.S. Appl. No. 11/667,274.

US Office Action, dated Feb. 22, 2010, for U.S. Appl. No. 11/667,274.

US Office Action, dated Mar. 26, 2008, for U.S. Appl. No. 11/667,274.

FIG.2
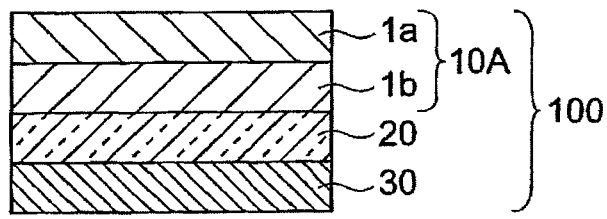
FIG.3
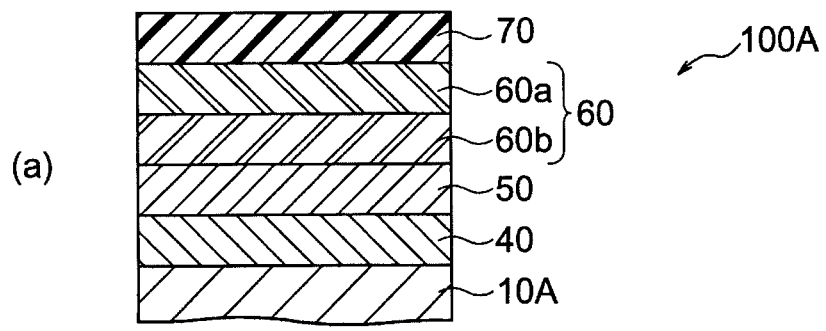
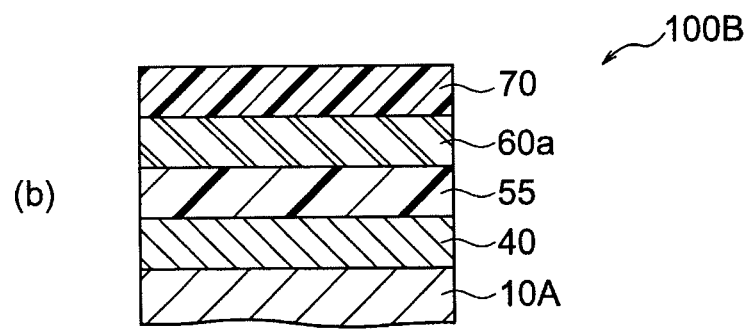
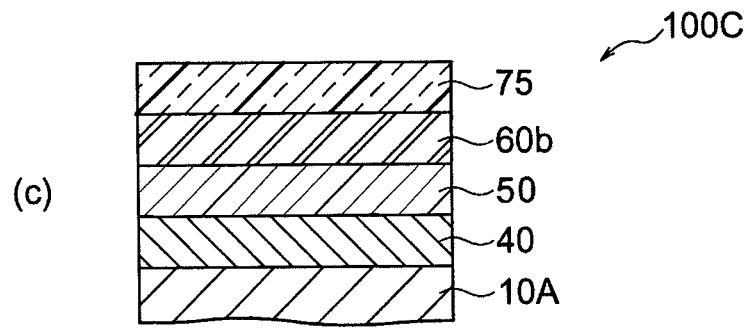

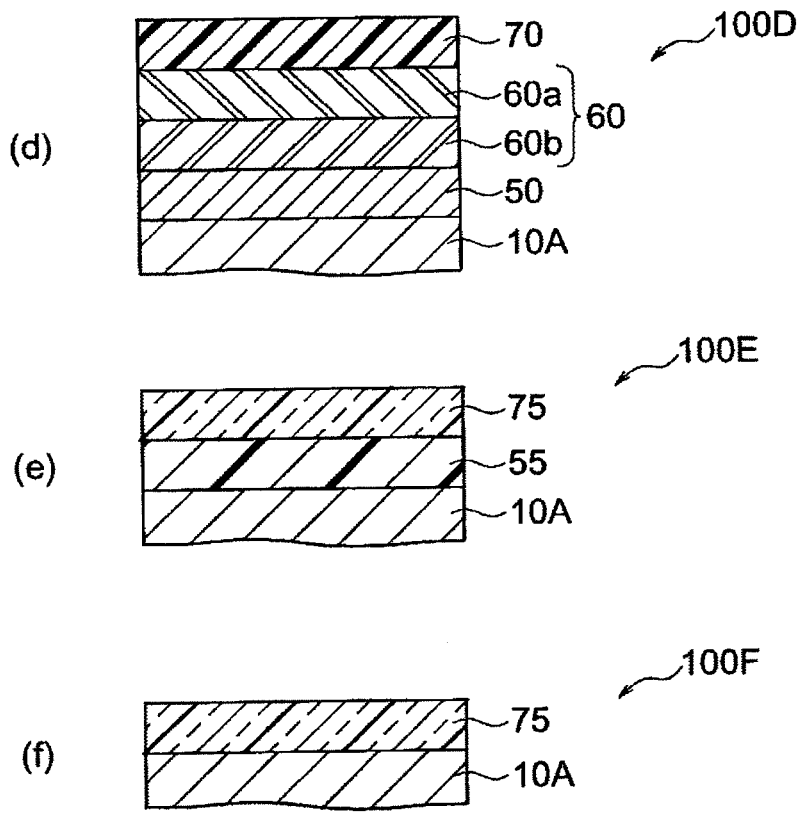
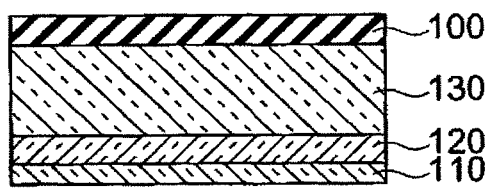
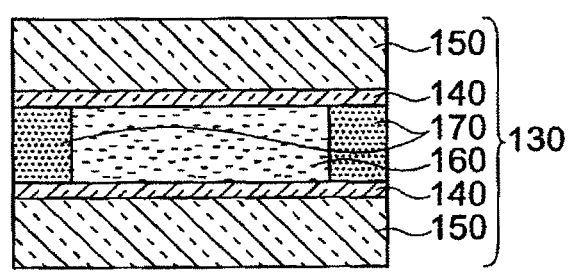

DEFLECTING PLATE AND LIQUID CRYSTAL DISPLAY DEVICE

CROSS REFERENCE

The present application is a 37 C.F.R. §1.53(b) divisional of, and claims priority to, U.S. application Ser. No. 11/667,275, filed Jul. 25, 2007. Application Ser. No. 11/667,275 is the national phase under 35 U.S.C. §371 of International Application No. PCT/JP2005/020453, filed on Nov. 8, 2005. Priority is also claimed to Japanese Application No. 2004-324547 filed on Nov. 9, 2004. The entire contents of each of these applications is hereby incorporated by reference.

TECHNICAL FIELD

The present invention relates to a polarizer plate exhibiting high tenacity and high surface hardness, and a liquid crystal display device including the polarizer plate and a liquid crystal cell.

BACKGROUND ART

In related-art technology, a polarizer plate protective film is bonded to each side of a polarizer in order to improve the durability of the polarizer. The polarizer plate protective film is required to exhibit high tenacity and high surface hardness. In general, a polymer exhibiting high surface hardness has a high flexural modulus, but is fragile. Therefore, when using a polymer exhibiting high surface hardness as the material for the polarizer plate protective film, cracks tend to occur when forming the polarizer plate. On the other hand, when using a polymer exhibiting high tenacity as the material for the polarizer plate protective film, the resulting polarizer plate protective film exhibits insufficient surface hardness. Therefore, a known polarizer plate protective film is generally produced by using a polymer with a low modulus of elasticity as a base film and forming a hard coating layer on the surface of the film in order to improve surface hardness.

In this method, after forming the base film, a hard coating layer forming solution is applied and dried (and cured in some cases) to form the hard coating layer. However, since it is necessary to form a hard coating layer to a large thickness in order to provide the hard coating layer with sufficient hardness, production becomes complicated, whereby the yield decreases.

In order to solve this problem, a multilayer polarizer plate protective film has been proposed which is produced by stacking resins to make the most of the properties of each resin (e.g. JP-A-2000-206303 and JP-A-2002-249600). However, the polarizer plate protective film disclosed in these documents also has a problem in terms of the balance between surface hardness and tenacity, whereby cracks may occur when forming the polarizer plate.

The present invention has been achieved in view of the above-described situation of the related art. An object of the present invention is to provide a polarizer plate exhibiting high tenacity and high surface hardness, and a liquid crystal display device including the polarizer plate and a liquid crystal cell.

DISCLOSURE OF THE INVENTION

The inventors of the present invention have conducted extensive studies in order to achieve the above object. As a result, the inventors have found that a polarizer plate having a polarizer protection function and exhibiting excellent tenacity and surface hardness can be obtained by stacking a layer including a thermoplastic resin with a relatively low flexural modulus as the main component and a layer including a thermoplastic resin with a relatively high flexural modulus as the main component on one side of a polarizer and disposing a protective layer on the other side of the polarizer. This finding has led to the completion of the present invention.

According to a first aspect of the present invention, a polarizer plate as defined in the following (1) to (7) is provided.

(1) A polarizer plate comprising at least a protective layer A, a polarizer, and a protective layer B in that order, the protective layer A including at least layers a and b respectively including a thermoplastic resin as a main component, the layer a having a flexural modulus higher than that of the layer b.

(2) The polarizer plate according to (1), wherein the protective layer A has a water vapor transmission rate of 10 g/day·m² or less.

(3) The polarizer plate according to (1), wherein the protective layer A is obtained by coextrusion.

(4) The polarizer plate according to (1), wherein the layer a has a flexural modulus of 3 GPa to 4 GPa.

(5) The polarizer plate according to (1), wherein the layer b has a flexural modulus of 0.1 GPa to 3 GPa.

(6) The polarizer plate according to (1), wherein a difference in flexural modulus between the layers a and b is 0.2 GPa to 2.5 GPa.

(7) The polarizer plate according to (1), wherein the protective layer B is a layer exhibiting birefringence.

According to a second aspect of the present invention, a liquid crystal display device as defined in the following (8) to (10) is provided.

(8) A liquid crystal display device comprising a light source, an incident-side polarizer plate, a liquid crystal cell, and an exit-side polarizer plate in that order, the incident-side polarizer plate and/or the exit-side polarizer plate being the polarizer plate according to (1).

(9) A liquid crystal display device comprising a light source, an incident-side polarizer plate, a liquid crystal cell, and an exit-side polarizer plate in that order, the exit-side polarizer plate being the polarizer plate according to (1).

(10) A liquid crystal display device comprising a light source, an incident-side polarizer plate, a liquid crystal cell, and an exit-side polarizer plate in that order, the incident-side polarizer plate and/or the exit-side polarizer plate being the polarizer plate according to (1), and the polarizer plate being disposed so that the layer a does not face the liquid crystal cell.

BRIEF DESCRIPTION OF THE DRAWINGS

FIG. 2 is a view showing a specific example of the layer configuration of the polarizer plate of the present invention.

FIG. 3 is a view showing specific examples of the layer configuration of the polarizer plate of the present invention.

FIG. 4 is a view showing specific examples of the layer configuration of the polarizer plate of the present invention.

FIG. 5 is a cross-sectional view of the layer configuration of a liquid crystal display device including the polarizer plate of the present invention.

FIG. 6 is a cross-sectional view of the layer configuration of a liquid crystal display cell shown in FIG. 5.

BEST MODE FOR CARRYING OUT THE INVENTION

Figure 1:
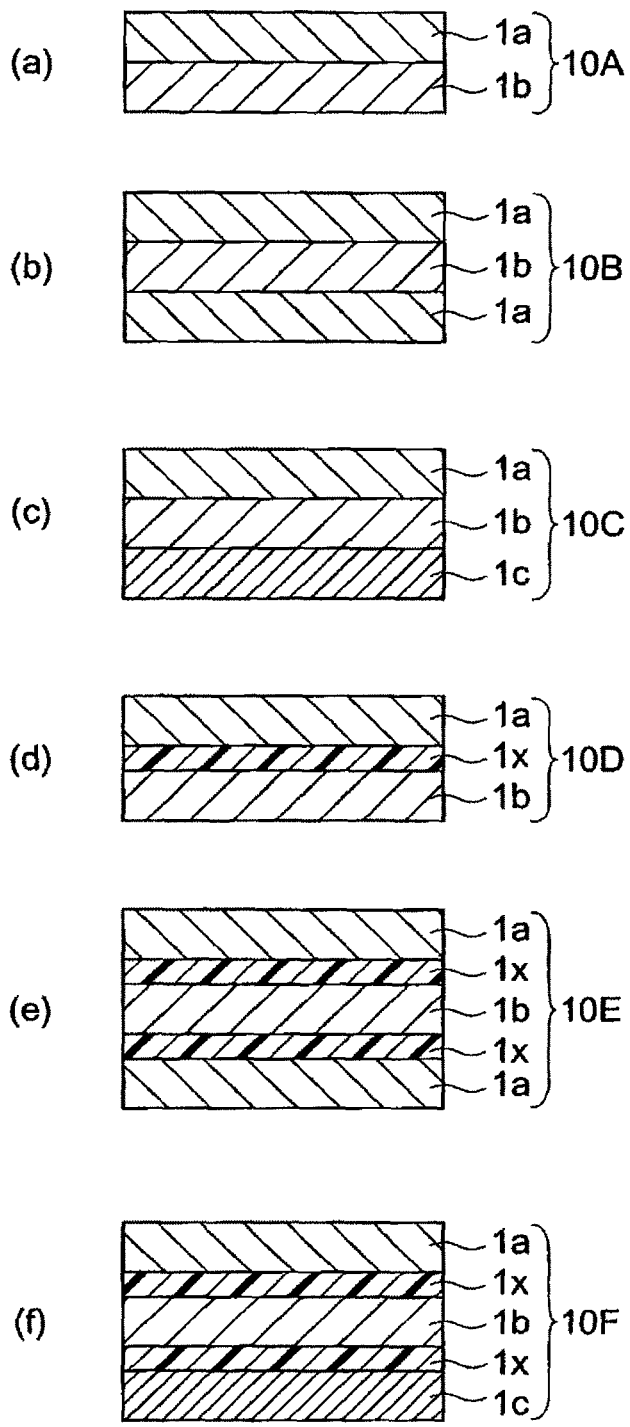
FIG. 1 is a view showing the layer configurations of a protective layer A of a polarizer plate of the present invention.

The present invention is described below in detail.

1) Polarizer Plate

A polarizer plate of the present invention includes at least a protective layer A, a polarizer, and a protective layer B in that order, the protective layer A including at least layers a and b respectively including a thermoplastic resin as a main component, the layer a having a flexural modulus higher than that of the layer b.

(1) Protective Layer A

The protective layer A of the polarizer plate of the present invention is a layer including at least the layers a and b respectively including a thermoplastic resin as the main component. The term "including a thermoplastic resin as the main component" means that a resin component forming each of the layers a and b is a thermoplastic resin, and the layers a and b may optionally include an additive and the like.

(i) Layer a

The thermoplastic resin included in the layer a is not particularly limited insofar as the thermoplastic resin exhibits high transparency. It is preferable to use a thermoplastic resin exhibiting a transmittance of 80% or more and a haze value of 0.5% or less.

As specific preferred examples of the thermoplastic resin included in the layer a, a vinyl aromatic polymer, a poly(meth)acrylate polymer, a polyacrylonitrile polymer, a vinyl alicyclic hydrocarbon polymer, a hydrogenated product thereof, and the like can be given. These thermoplastic resins may be used either individually or in combination of two or more. The term "(meth)acrylate" means acrylate and/or methacrylate. This also applies to the following description.

The vinyl aromatic polymer is a polymer having at least a repeating unit derived from an aromatic compound having a vinyl group.

As examples of the aromatic compound having a vinyl group, styrene; styrene derivatives such as 4-methylstyrene, 3-methylstyrene, 4-chlorostyrene, 4-methoxystyrene, 4-tert-butoxystyrene, and α-methylstyrene; vinylnaphthalene such as 1-vinylnaphthalene and 2-vinylnaphthalene; and the like can be given.

As specific examples of the vinyl aromatic polymer, polystyrene; a copolymer of styrene and/or a styrene derivative and at least one compound selected from acrylonitrile, maleic anhydride, methyl methacrylate, and butadiene; a hydrogenated product of a copolymer of styrene and conjugated diene (including a hydrogenated product of an aromatic ring); and the like can be given.

The poly(meth)acrylate polymer is a polymer including at least a repeating unit derived from a (meth)acrylic acid compound.

As a specific examples of the (meth)acrylic acid compound, (meth)acrylic acid; (meth)acrylic acid amide; (meth)acrylate compounds such as methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, hexyl (meth)acrylate, 2-ethylhexyl (meth)acrylate, 2-hydroxyethyl (meth)acrylate, and polyethylene glycol mono(meth)acrylate; and the like can be given.

As specific examples of the poly(meth)acrylate polymer, a homopolymer of a (meth)acrylic acid compound; a copolymer of two or more (meth)acrylic acid compounds; a copolymer of a (meth)acrylic acid compound and other copolymerizable monomers; and the like can be given.

The polyacrylonitrile polymer is a polymer including at least a repeating unit derived from an acrylonitrile compound.

As examples of the acrylonitrile compound, acrylonitrile, methacrylonitrile, and the like can be given.

As a specific examples of the polyacrylonitrile polymer, a homopolymer of acrylonitrile; a copolymer of acrylonitrile and a monomer copolymerisable with acrylonitrile; and the like can be given.

As examples of the monomer copolymerisable with acrylonitrile, acrylic acid ester, methacrylic acid ester, styrene, vinyl acetate, glycidyl methacrylate, divinylbenzene, polyethylene glycol (n=1 to 9) dimethacrylate, and the like can be given.

The vinyl alicyclic hydrocarbon polymer is a polymer including a repeating unit derived from a vinyl alicyclic hydrocarbon compound.

As examples of the vinyl alicyclic hydrocarbon compound, vinylcycloalkanes such as vinylcyclopentane, vinylcyclohexane, and vinylcyclooctane; vinylcycloalkenes such as vinylcyclopentene, vinylcyclohexene, and vinylcyclooctene; and the like can be given.

As specific examples of the vinyl alicyclic hydrocarbon polymer, a polymer of a vinyl alicyclic hydrocarbon compound and a hydrogenated product thereof; a polymer of a vinyl aromatic hydrocarbon compound (e.g. styrene and α-methylstyrene) of which the aromatic ring is hydrogenated; and the like can be given.

When the vinyl aromatic polymer, the poly(meth)acrylate polymer, the polyacrylonitrile polymer, the vinyl alicyclic hydrocarbon polymer, and the hydrogenated product thereof are copolymers, these copolymers may be a random copolymer or a block copolymer such as a diblock copolymer, a triblock copolymer, a multiblock copolymer including four or more blocks, or a gradient block copolymer.

As the resin for the layer a, the vinyl aromatic polymer, the poly(meth)acrylate polymer, the vinyl alicyclic hydrocarbon polymer, or the hydrogenated product thereof is preferable, with polystyrene, a styrene-maleic acid copolymer, polymethyl methacrylate, the vinyl alicyclic hydrocarbon polymer, or the hydrogenated product thereof being more preferable.

(ii) Layer b

The thermoplastic resin forming the layer b is not particularly limited insofar as the thermoplastic resin exhibits high transparency and has a flexural modulus lower than that of the layer a. It is preferable to use a thermoplastic resin having a light transmittance of 80% or more and a haze value of 0.5% or less.

As specific preferred examples of the thermoplastic resin forming the layer b, an alicyclic structure-containing polymer, a cellulose polymer, a polyester polymer, a polycarbonate polymer, a polysulfone polymer, a polyethersulfone polymer, a vinyl aromatic polymer, a polyolefin polymer, a polyvinyl alcohol polymer, a polyvinyl chloride polymer, a poly(meth)acrylate polymer, and the like can be given. These polymers may be used either individually or in combination of two or more.

Of these polymers, the alicyclic structure-containing polymer; the cellulose polymer such as cellulose diacetate, cellulose triacetate, and cellulose acetate butyrate; the polyester polymer such as polyethylene terephthalate, polybuthylene terephthalate, and polyethylene naphthalate are preferable due to excellent transparency and the like. It is more preferable to use the alicyclic structure-containing polymer, cellulose triacetate, or polyethylene terephthalate from the viewpoint of transparency, dimensional stability, and reduced weight, with the alicyclic structure-containing polymer being particularly preferable from the viewpoint of low hygroscopicity and dimensional stability.

The alicyclic structure-containing polymer includes an alicyclic structure in the repeating unit of the polymer. As the alicyclic structure-containing polymer, a polymer including an alicyclic structure in the main chain or a polymer including an alicyclic structure in the side chain may be used.

As examples of the alicyclic structure, a cycloalkane structure, a cycloalkene structure, and the like can be given. Of these, the cycloalkane structure is preferable from the viewpoint of thermal stability and the like. The number of carbon atoms forming the alicyclic structure is not particularly limited. The number of carbon atoms is usually 4 to 30, preferably 5 to 20, and still more preferably 5 to 15. If the number of carbon atoms forming the alicyclic structure is within the above range, a polarizer plate exhibiting excellent heat resistance and flexibility can be obtained.

The content of the repeating unit having the alicyclic structure in the alicyclic structure-containing polymer may be arbitrarily selected depending on the application. The content of the repeating unit having the alicyclic structure is usually 50 wt % or more, preferably 70 wt % or more, and still more preferably 90 wt % or more. If the content of the repeating unit having the alicyclic structure is too low, heat resistance may be decreased. A repeating unit in the alicyclic structure-containing polymer other than the repeating unit having the alicyclic structure is arbitrarily selected depending on the application.

As specific examples of the alicyclic structure-containing polymer, a norbornene polymer, a monocyclic olefin polymer, a cyclic conjugated diene polymer, a hydrogenated product thereof, and the like can be given. Of these, the norbornene polymer is preferable from the viewpoint of transparency and moldability.

As specific examples of the norbornene polymer, a ring-opening polymer of norbornene monomers, a ring-opening copolymer of a norbornene monomer and a monomer which can undergo ring-opening copolymerization with the norbornene monomer, hydrogenated products of these copolymers, an addition polymer of norbornene monomers, an addition polymer of a norbornene monomer and a monomer which can undergo addition copolymerization with the norbornene monomer, and the like can be given. Of these, the hydrogenated product of the ring-opening (co)polymer of norbornene monomers is preferable from the viewpoint of transparency.

As examples of the norbornene monomer, bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodec-3-ene (common name: tetracyclododecene), derivatives (e.g. derivative including a substituent on the ring) of these compounds, and the like can be given. As examples of the substituent, an alkyl group, an alkylene group, an alkoxycarbonyl group, a carboxyl group, and the like can be given. The same or different substituents may be bonded to the ring in combination. The norbornene monomers may be used either individually or in combination of two or more.

As examples of the monomer which can undergo ring-opening copolymerization with the norbornene monomer, monocyclic olefins such as cyclohexene, cycloheptene, and cyclooctene, and derivatives thereof; cyclic conjugated dienes such as cyclohexadiene and cycloheptadiene, and derivatives thereof; and the like can be given.

The ring-opening polymer of the norbornene monomers and the ring-opening polymer of the norbornene monomer and the monomer copolymerizable with the norbornene monomer may be obtained by polymerizing the monomers in the presence of a ring-opening polymerization catalyst.

As the ring-opening polymerization catalyst, a known catalyst may be used.

As examples of the monomer which can undergo addition copolymerization with the norbornene monomer, α-olefins having 2 to 20 carbon atoms such as ethylene and propylene, and derivatives thereof; cycloolefins such as cyclobutene and cyclopentene, and derivatives thereof; nonconjugated dienes such as 1,4-hexadiene; and the like can be given. These monomers may be used either individually or in combination of two or more. Of these, the α-olefins are preferable, with ethylene being still more preferable.

The addition polymer of the norbornene monomers and the addition polymer of the norbornene monomer and the monomer copolymerizable with the norbornene monomer may be obtained by polymerizing the monomers in the presence of an addition polymerization catalyst. As the addition polymerization catalyst, a known catalyst may be used.

The hydrogenated products of the ring-opening polymer of the norbornene monomers, the ring-opening copolymer of the norbornene monomer and the monomer which can undergo ring-opening copolymerization with the norbornene monomer, the addition polymer of the norbornene monomers, and the addition copolymer of the norbornene monomer and the monomer which can undergo addition copolymerization with the norbornene monomer may be obtained by adding a known hydrogenation catalyst to the unhydrogenated polymer and hydrogenating the carbon-carbon unsaturated bonds in an amount of preferably 90% or more.

As examples of the monocyclic olefin polymer, addition polymers of cyclohexene, cycloheptene, and cyclooctene can be given.

As examples of the cyclic conjugated diene polymer, 1,2-addition or 1,4-addition polymers of cyclic conjugated diene monomers such as cyclopentadiene and cyclohexadiene can be given.

The weight average molecular weight of the thermoplastic resin forming each of the layers a and b is usually 10,000 to 300,000, preferably 15,000 to 250,000, and more preferably 20,000 to 200,000. When producing the protective layer A in the shape of a film using the thermoplastic resins having a weight average molecular weight within the above range, the mechanical strength and the formability of the film are well balanced.

The weight average molecular weight of the thermoplastic resin forming each of the layers a and b may be determined as a polyisoprene-reduced (polystyrene-reduced when using toluene) weight average molecular weight measured by gel permeation chromatography using cyclohexane (toluene when the thermoplastic resin is not dissolved in cyclohexane) as a solvent.

The glass transition temperature of the thermoplastic resin forming each of the layers a and b may be arbitrarily selected depending on the application. The glass transition temperature of the thermoplastic resin is preferably 80° C. or more, and more preferably 100 to 250° C. If the glass transition temperature of the thermoplastic resin is within the above range, the resulting protective layer A in the shape of a film does not produce deformation and stress during use at a high temperature and a high humidity and exhibits excellent durability.

The molecular weight distribution (weight average molecular weight (Mw)/number average molecular weight (Mn)) of the thermoplastic resin forming each of the layers a and b is usually 1.0 to 10.0, preferably 1.0 to 6.0, and more preferably 1.1 to 4.0. The mechanical strength and the formability of the resulting protective layer A are well balanced by adjusting the molecular weight distribution in the above range.

The molecular weight distribution of the thermoplastic resin forming each of the layers a and b may be measured by the above-mentioned gel permeation chromatography.
(Flexural Modulus)

The protective layer A of the polarizer plate of the present invention includes at least the layer a and the layer b, the layer a has a flexural modulus higher than that of the layer b.

The term "flexural modulus" refers to the ratio of load and deflection when applying a flexural load to an object. In more detail, when strains at two specific points are $\epsilon 1$ and $\epsilon 2$ and stress corresponding to these strains are $\rho 1$ and $\rho 2$, the term "flexural modulus" refers to a value obtained by dividing the difference in stress ($\rho 2$-$\rho 1$) by the difference in strain ($\epsilon 2$-$\epsilon 1$).

In general, a polymer exhibiting high tenacity has a low flexural modulus, and a polymer exhibiting high surface hardness has a high flexural modulus. The present invention provides a polarizer plate exhibiting high tenacity and high surface hardness by forming the protective layer A using the layer a which has a relatively high flexural modulus and exhibits high surface hardness and the layer b which has a relatively low flexural modulus and exhibits excellent tenacity in combination. In this case, the layer a is disposed closer to the viewer than the layer b, if necessary.

It suffices that the layer a have a flexural modulus relatively higher than that of the layer b. In order to obtain a polarizer plate exhibiting higher tenacity and higher surface hardness, it is preferable that the layer a have a flexural modulus of 3 GPa or more, and preferably 3 to 4 GPa, and the layer b have a flexural modulus of less than 3 GPa, and preferably 0.1 to 3 GPa. If the flexural modulus of the layer a exceeds 4 GPa, opacity or melt viscosity may be increased, whereby it may become difficult to form a film. If the flexural modulus of the layer b is less than 0.1 GPa, melt viscosity may be decreased, whereby it may become difficult to form a film.

The difference in flexural modulus between the layers a and b is not particularly limited insofar as the layer a has a flexural modulus relatively higher than that of the layer b. The difference in flexural modulus between the layers a and b is preferably 0.2 to 2.5 GPa, and more preferably 0.5 to 2.0 GPa. If the difference in flexural modulus between the layers a and b is too small, the balance between the tenacity and the surface hardness of the resulting polarizer plate may deteriorate. If the difference in flexural modulus between the layers a and b is too large, it may be difficult to form a uniform film when molding the protective layer A.

As examples of a preferred combination of the layers a and b, vinyl aromatic polymer/alicyclic structure-containing polymer and poly(meth)acrylate polymer/alicyclic structure-containing polymer (layer a/layer b) can be given, since the water vapor transmission rate, tenacity, and surface hardness of the protective layer A are well balanced. In particular, combinations of polystyrene/alicyclic structure-containing polymer, styrene-maleic acid copolymer/alicyclic structure-containing polymer, and polymethyl methacrylate/alicyclic structure-containing polymer are preferable.

It suffices that the protective layer A be a laminate including at least the layers a and b. The protective layer A may include a layer c (third layer) opposite to the layer a through the layer b, or may include a layer x (intermediate layer) optionally provided between the layers a and b.

The layer c is provided in order to prevent an antireflection film from curling, and may be formed of a material exhibiting affinity with the resin forming the layer a and the resin forming the layer b. As an example of the layer c, a layer formed of a thermoplastic resin having high transparency and exhibiting affinity with the resin forming the layer a and the resin forming the layer b can be given. The layer c may be formed of the same resin as the layer a or b.

The layer c cannot prevent curling if the thickness of the layer c is too small or too great. The thickness of the layer c is usually 5 to 100 μm, and preferably 10 to 50 μm.

The layer x may be formed of a resin exhibiting affinity with the resin forming the layer a and the resin forming the layer b. As examples of the material for the layer x, a polyesterurethane resin, a polyetherurethane resin, a polyisocyanate resin, a polyolefin copolymer, a resin having a hydrocarbon skeleton in the main chain, a polyamide resin, an acrylic resin, a vinyl chloride-vinyl acetate copolymer, chlorinated rubber, cyclized rubber, a modified product obtained by introducing a polar group into these polymers, a hydrogenated product of a vinyl aromatic compound-conjugated diene block copolymer, and the like can be given. Of these, the hydrogenated product of a vinyl aromatic compound-conjugated diene block copolymer, such as a hydrogenated product of a styrene-butadiene-styrene block copolymer (SEBS copolymer) or a modified product thereof, or the polyolefin copolymer or a modified product thereof is preferably used.

As examples of the polyolefin copolymer, an ethylene-(meth)acrylate copolymer such as an ethylene-methyl (meth)acrylate copolymer and an ethylene-ethyl (meth)acrylate copolymer; a ternary copolymer obtained by copolymerizing ethylene, (meth)acrylic acid ester, and another copolymerisable monomer (e.g. propylene, maleic acid, or vinyl acetate); an ethylene-vinyl acetate copolymer; an ethylene-styrene copolymer; an ethylene-glycidyl (meth)acrylate copolymer; and the like can be given.

As examples of the method of introducing a polar group into the polyolefin copolymer, oxidation, saponification, chlorination, chlorosulfonation, addition of an unsaturated carboxylic acid, and the like can be given. Of these, the addition of an unsaturated carboxylic acid is preferably used.

The method of producing the protective layer A is not particularly limited. For example, (i) a method including separately forming the layers a and b and stacking the layers a and b through the layer x by means of dry lamination to obtain a laminate, (ii) a method including forming the layers a and b by means of coextrusion to obtain a laminate, and the like can be given.

In particular, the coextrusion method (ii) is preferable since the method (ii) allows provision of a laminate having a large interlayer peel strength and exhibits excellent production efficiency. When producing the protective layer A using the coextrusion method, the layers a and b are formed by extruding the resin material for the layer a and the resin material for the layer b from a die for multilayer using a plurality of extruders.

When producing the protective layer A by coextrusion, an additive may be added in advance to the layer a, the layer b and/or the layer c in such an amount that the object of the present invention is not impaired.

The additive which may be used is not particularly limited. As examples of the additive, a layer crystal compound; an inorganic particle; a stabilizer such as an antioxidant, a thermal stabilizer, a light stabilizer, a weatherability stabilizer, a UV absorber, and a near-infrared ray absorber; a resin modifier such as a lubricant and a plasticizer; a coloring agent such as a dye and a pigment; an antistatic agent; and the like can be given. These additives may be used either individually or in combination of two or more. The amount of the additive may be arbitrarily determined insofar as the object of the present invention is not impaired.

The total thickness of the resulting protective layer A is usually 30 to 200 μm, preferably 40 to 150 μM, and particularly preferably 50 to 100 μm.

The thickness of the layer a included in the protective layer A is usually 5 to 100 μm, and preferably 10 to 50 μm. If the thickness of the layer a is less than the above range, surface hardness may not be increased. If the thickness of the layer a exceeds the above range, the film may become fragile.

The thickness of the layer b is usually 5 to 100 μm, and preferably 10 to 50 μm. If the thickness of the layer b is less than the above range, the film may become fragile. If the thickness of the layer b exceeds the above range, the transparency of the film may deteriorate. Moreover, the thickness of the entire polarizer plate may be increased, whereby a reduction in size of a display may be hindered.

When the protective layer A includes the layer x as the intermediate layer, the thickness of the layer x is usually 0.1 to 20 μm, and preferably 1 to 15 μm. If the thickness of the layer x exceeds 20 μm, surface hardness may not be increased.

In the polarizer plate of the present invention, it is preferable that the protective layer A have a low water vapor transmission rate. The water vapor transmission rate of the protective layer A is preferably 10 g/day·m² or less, more preferably 8 g/day·m² or less, and particularly preferably 6 g/day·m² or less. The degree of polarization of the polarizer gradually decreases as the polarizer absorbs water in air. Therefore, a polarizer plate exhibiting excellent durability can be obtained by bonding the protective layer A with a low water vapor transmission rate to the polarizer. The water vapor transmission rate may be measured using a method in accordance with JIS K7209.

FIGS. 1(a) to 1(f) show specific examples of the layer configuration of the protective layer A. In FIGS. 1(a) to 1(f), a symbol 1a indicates the layer a, a symbol 1b indicates the layer b, a symbol 1c indicates the layer c, and a symbol 1x indicates the adhesive layer (layer x).

FIG. 1(a) shows a protective layer A (10A) having a two-layer structure formed of the layers a and b, FIG. 1(b) shows a protective layer A (10B) having a three-layer structure formed of the layers a, b, and a, FIG. 1(c) shows a protective layer A (10C) having a three-layer structure formed of the layers a, b, and c, FIG. 1(d) shows a protective layer A (10D) having a three-layer structure formed of the layers a, x, and b, FIG. 1(e) shows a protective layer A (10E) having a five-layer structure formed of the layers a, x, b, x, and a, and FIG. 1(f) shows a protective layer A (10F) having a five-layer structure formed of the layers a, x, b, x, and c. The protective layer A forming the polarizer plate of the present invention is not limited to the configurations shown in FIGS. 1(a) to 1(f). It suffices that the protective layer A include at least the layers a and b.

Of these, the protective layer A (10D) having a three-layer structure formed of the layers a, x, and b shown in FIG. 1(d) and the protective layer A (10E) having a five-layer structure formed of the layers a, x, b, x, and a shown in FIG. 1(e) are preferable, since a polarizer plate exhibiting high tenacity and high surface hardness can be obtained.

(2) Polarizer

The polarizer used in the polarizer plate of the present invention is not particularly limited insofar as the polarizer has a polarizer function. As examples of the polarizer, polarizers formed of polyvinyl alcohol (PVA) and polyene can be given.

The method of producing the polarizer is not particularly limited. As examples of the method of producing a PVA polarizer, a method including causing an iodine ion to be adsorbed on a PVA film and uniaxially stretching the PVA film, a method including uniaxially stretching a PVA film and causing an iodine ion to be adsorbed on the PVA film, a method including causing an iodine ion to be adsorbed on a PVA film while uniaxially stretching the PVA film, a method including dyeing a PVA film with a dichroic dye and uniaxially stretching the PVA film, a method including uniaxially stretching a PVA film and dyeing the PVA film with a dichroic dye, and a method including dyeing a PVA film with a dichroic dye while uniaxially stretching the PVA film can be given.

As examples of the method of producing a polyene polarizer, known methods such as a method including uniaxially stretching a PVA film and heating/dehydrating the PVA film in the presence of a dehydration catalyst, and a method including uniaxially stretching a polyvinyl chloride film and heating/dehydrating the polyvinyl chloride film in the presence of a hydrochloric acid removal catalyst can be given.

(3) Protective layer B

The protective layer B of the polarizer plate of the present invention is a layer exhibiting high transparency and having a function of protecting the polarizer. It is preferable that the protective layer B be a layer exhibiting a variation in in-plane retardation (ΔR) within ±2%.

When the in-plane main refractive indices of the film are nx and ny and the thickness of the film is d (nm), the in-plane retardation (Re) of the film can calculated by Re=(nx−ny)×d. When the in-plane main refractive indices of the film are nx and ny, the refractive index in the direction of the thickness of the film is nz, and the thickness of the film is d (nm), the in-plane retardation (Rth) in the direction of the thickness of the film can calculated by Rth=((nx+ny)/2−nz)×d.

The refractive indices (nx, ny, nz) are measured five times at five arbitrary places in the film plane using a known automatic birefringence meter, the retardations (Re, Rth) are calculated using the measurement results, and the average value of the calculation results is taken as the representative retardation.

The variation in retardation (ΔR) may be calculated by the following expression (1) or (2). The largest value obtained by the expressions (1) and (2) is taken as the variation in retardation (ΔR). R is the representative retardation, Rmin is the minimum retardation, and Rmax is the maximum retardation.

$$\Delta R = (R - R\text{min})/R \times 100(\%) \tag{1}$$

$$\Delta R = (R - R\text{max})/R \times 100(\%) \tag{2}$$

As examples of a resin forming the protective layer B, an alicyclic structure-containing polymer, a cellulose resin, a polycarbonate resin, and the like can be given. Of these, the alicyclic structure-containing polymer and the cellulose resin are preferable due to excellent transparency, birefringence, dimensional stability, and the like, with the alicyclic structure-containing polymer being particularly preferable.

As examples of the alicyclic structure-containing polymer and the cellulose resin, the resins given as examples for the layer b of the protective layer A can be given.

The polycarbonate resin is a thermoplastic resin having a carbonate bond and obtained by reacting an aromatic dihydric phenol compound and phosgene or a carbonic acid diester. As examples of the dihydric phenol compound, 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, 1-phenyl-1,1-bis(4-hydroxyphenyl)ethane, and the like can be given.

The protective layer B need not exhibit birefringence. A layer exhibiting birefringence is not particularly limited insofar as the layer exhibits a retardation due to birefringence. For example, a layer obtained by providing a transparent resin layer with birefringence by stretching or the like, a liquid crystal polymer oriented film, and a layer obtained by causing an anisotropic material such as a liquid crystal polymer to be oriented on an oriented film such as a transparent resin layer. Of these, a layer obtained by providing a transparent resin layer with birefringence by stretching or the like is preferable.

The stretching for providing a transparent resin layer with birefringence may be performed using an arbitrary method such as uniaxial stretching or biaxial stretching using a free end or a fixed end. In the present invention, a film oriented in the thickness direction, a film in which the direction of the main refractive index in the thickness direction is inclined with respect to the normal direction of the film, or the like may also be used as the layer exhibiting birefringence.

The protective layer B may be formed of a single layer or may be a laminate formed of a plurality of layers. The thickness of the protective layer B is usually 20 to 300 µm, and preferably 40 to 200 µm.

(4) Polarizer Plate

In the polarizer plate of the present invention, at least the protective layer A, the polarizer, and the protective layer B are stacked in that order.

The polarizer plate of the present invention may be produced by stacking the polarizer on one side of a transparent film (B) forming the protective layer B, and stacking a transparent film (A) forming the protective layer A on the polarizer so that the layer a of the film is disposed on the surface, for example.

The transparent films (A) and (B) and the polarizer may be stacked using an arbitrary bonding means such as an adhesive or a pressure-sensitive adhesive. As examples of the adhesive or the pressure-sensitive adhesive, an acrylic, silicone, polyester, polyurethane, polyether, or rubber adhesive or pressure-sensitive adhesive can be given. Of these, the acrylic adhesive or pressure-sensitive adhesive is preferable from the viewpoint of heat resistance, transparency, and the like.

In the present invention, the transparent films (A) and (B), which are subjected to surface modification on one side or each side, may also be used. Adhesion to the polarizer can be improved by using a transparent film subjected to surface modification.

As examples of surface modification, an energy ray irradiation treatment, a chemical treatment, and the like can be given.

As examples of the energy ray irradiation treatment, a corona discharge treatment, a plasma treatment, an electron beam irradiation treatment, an ultraviolet radiation irradiation treatment, and the like can be given. Of these, the corona discharge treatment and the plasma treatment are preferable in view of the treatment efficiency and the like, with the corona discharge treatment being particularly preferable. As the chemical treatment, a method can be given in which the transparent film is immersed in an oxidizing agent aqueous solution such as potassium dichromate solution or concentrated sulfuric acid, and sufficiently washed with water. It is effective to shake the container in a state in which the transparent film is immersed in the oxidizing agent aqueous solution. However, the surface of the transparent film may be dissolved or the transparency of the transparent film may be decreased if the transparent film is chemically treated for a long time. Therefore, it is necessary to adjust the treatment time and the like depending on the reactivity, concentration, and the like of the chemical used.

In the polarizer plate of the present invention, it suffices that at least the protective layer A, the polarizer, and the protective layer B be stacked in that order. If necessary, a primer layer, a hard coating layer, an antireflective layer, a stainproof layer, or the like may be additionally formed on the surface of the protective layer A (i.e. the side opposite to the protective layer B).

The primer layer is formed to provide and increase the adhesion between the transparent film (A) and the hard coating layer or a high-refractive-index layer formed on the transparent film (A).

As examples of the material for the primer layer, a polyesterurethane resin, a polyetherurethane resin, a polyisocyanate resin, a polyolefin resin, a resin having a hydrocarbon skeleton in the main chain, a polyamide resin, an acrylic resin, a polyester resin, a vinyl chloride-vinyl acetate copolymer, chlorinated rubber, cyclized rubber, a modified product obtained by introducing a polar group into these polymers, and the like can be given.

Of these, it is preferable to use the modified product of the resin having a hydrocarbon skeleton in the main chain and the modified product of the cyclized rubber. As examples of the resin having a hydrocarbon skeleton in the main chain, a resin having a polybutadiene skeleton or a resin having an at least partially hydrogenated polybutadiene skeleton can be given. As specific examples of these resins, a polybutadiene resin, a hydrogenated polybutadiene resin, a styrene-butadiene-styrene block copolymer (SBS copolymer), a hydrogenated styrene-butadiene-styrene block copolymer (SEBS copolymer), and the like can be given. Of these, a modified product of the hydrogenated product of the styrene-butadiene-styrene block copolymer may be suitably used. As the compound for introducing a polar group used to obtain the modified polymer, a carboxylic acid or its derivative is preferable.

The method of forming the primer layer is not particularly limited. For example, the primer layer is formed by applying a coating liquid for forming the primer layer to the film using a known coating method. The thickness of the primer layer is usually 0.01 to 5 µm, and preferably 0.1 to 2 µm.

When using a transparent film subjected to surface modification as the transparent film (A) forming the protective layer A, the primer layer may be omitted.

The hard coating layer is formed to increase the surface hardness, cycle fatigue resistance, and scratch resistance of the transparent plastic film. The material for the hard coating layer is not particularly limited insofar as the material exhibits a hardness of "HB" or more in a pencil hardness test defined in JIS K5400. As examples of the material for the hard coating layer, an organic hard coating material such as an organosilicone material, a melamine material, an epoxy material, and an acrylic material; an inorganic hard coating material such as silicon dioxide; and the like can be given. It is preferable to use a polyfunctional acrylate hard coating material from the viewpoint of excellent adhesion and productivity.

The method of forming the hard coating layer is not particularly limited. For example, the hard coating layer may be formed by applying a coating liquid for forming the hard coating layer to the film using a known coating method and curing the coating liquid by applying ultraviolet rays. The thickness of the hard coating layer is usually 0.5 to 30 µm, and preferably 3 to 15 µm, although the thickness of the hard coating layer is not particularly limited.

When the layer a included in the protective layer A is a layer exhibiting high surface hardness, the layer a may be allowed to function as the hard coating layer.

Various additives may be optionally added to the materials for the primer layer and the hard coating layer. The additive is not particularly limited, and an additive generally used for a thermoplastic resin material may be utilized. As examples of the additive, an antioxidant, a UV absorber, a light stabilizer, a coloring agent, a lubricant, a plasticizer, an antistatic agent, and the like can be given.

The antireflective layer is a layer having a function of suppressing reflection at the interface and improving the light transmittance. As the antireflective layer, an antireflective layer having a known layer configuration may be employed. As examples of the antireflective layer, an antireflective layer formed of a layer having a relatively low refractive index, an antireflective layer formed by stacking a layer having a relatively high refractive index and a layer having a relatively low refractive index, and the like can be given.

The method of forming the antireflective layer is not particularly limited. For example, an antireflective layer in which a low-refractive-index layer formed of a fluororesin and a high-refractive-index layer formed of a thermoplastic resin are stacked (see JP-A-9-227713, JP-A-11-30706, and U.S. Pat. No. 6,129,980), an antireflective layer including a low-refractive-index layer formed of a fluororesin and a high-refractive-index layer formed by sintering an antimony sol (see JP-A-11-72602), an antireflective layer including a high-refractive-index layer including an activated energy ray-curable resin and inorganic oxide particles and having a refractive index of the entire layer of 1.55 or more and a low-refractive-index layer having a refractive index of 1.36 or less and provided on the high-refractive-index layer (see Japanese Patent Application No. 2004-153332), a low-refractive-index layer having a refractive index of 1.25 to 1.36 and a reflectance of 50% or less after a steel wool test (see Japanese Patent Application No. 2004-133542), and the like can be given.

When the hard coating layer has a high refractive index, the hard coating layer may be allowed to function as the antireflective layer. When the protective layer A has a high refractive index, the protective layer A may be allowed to function as the hard coating layer and the antireflective layer.

The stainproof layer is a layer for suppressing stain of oils and fats such as fingerprints and improving wiping properties when stain of oils and fats has occurred. As the index for evaluating the properties of the stainproof layer, the contact angle with pure water can be given. A stainproof layer having a contact angle with pure water of 90° or more, preferably 100° or more is preferable.

The material for the stainproof layer is not particularly limited. A known material may be used as the material for the stainproof layer. In particular, a layer formed of an organosilicon compound or a fluorine compound can be conveniently used. As specific examples of the stainproof layer, layers formed of perfluorosilane, fluorocarbon, an organosilicon compound having a fluoroalkyl group or a fluorocycloalkyl group, a fluorine-containing epoxy polymer, an epoxy group-containing fluorosilicon polymer, a fluorine-containing acrylate, a fluorine-containing methacrylate, a fluorine-containing fumaric acid diester, a fluorine-containing unsaturated dibasic acid diester, a silanol-terminated organic polysiloxane, a fluoroalkylacyl group-containing polysiloxane, a copolymer of perfluoroalkyl acrylate or perfluoroalkyl methacrylate and a monomer having an alkoxysilane group, a copolymer of acrylate or methacrylate having a long-chain fluoroalkyl group and a silicon-containing polymerizable unsaturated monomer, a copolymer of organic silazane having a long-chain perfluoroalkyl group or perfluoroalkyl ether group, a compound containing a fluorine surfactant, and the like can be given.

The thickness of the stainproof layer is usually 50 nm or less. The method of forming the stainproof layer is not particularly limited. A known method may be used depending on the material used for the stainproof layer. For example, the stainproof layer may be formed using a general coating method including a physical vapor deposition method such as evaporation, sputtering, or ion plating, a vacuum process such as chemical vapor deposition (CVD) or plasma polymerization, and a wet process such as microgravure, screen coating, or dip coating.

When the stainproof layer has a low refractive index, the stainproof layer may be allowed to function as the low-refractive-index layer of the antireflective layer.

FIGS. 2 to 4 show examples of the layer configuration of the polarizer plate of the present invention. A polarizer plate (100) shown in FIG. 2 has a structure in which a polarizer (20) is stacked on a protective layer B (30), and a protective layer A (10A) formed of a layer a (1a) and a layer b (1b) is stacked on the polarizer (20) so that the layer a (1a) is positioned on the viewer side.

FIGS. 3(a) to 3(c) and FIGS. 4(d) to 4(f) show examples of a polarizer plate having a structure in which other layers such as the primer layer, the hard coating layer, the antireflective layer, and the stainproof layer are stacked on the protective layer A (10A) of the polarizer plate shown in FIG. 2. In FIGS. 3(a) to 3(c) and FIGS. 4(d) to 4(f), only the protective layer A (10A) of the polarizer plate shown in FIG. 2 is illustrated, and the polarizer (20) and the protective layer B (30) are omitted.

In a polarizer plate (100A) shown in FIG. 3(a), a primer layer (40), a hard coating layer (50), an antireflective layer (60), and a stainproof layer (70) are stacked on the protective layer A (10A) in that order. The antireflective layer (60) is formed of a high-refractive-index layer (60b) and a low-refractive-index layer (60a). Note that a high-refractive-index layer or a low-refractive-index layer may be additionally stacked on the low-refractive-index layer (60a).

In a polarizer plate (100B) shown in FIG. 3(b), a primer layer (40), a high-refractive-index hard coating layer (55), a low-refractive-index layer (60a), and a stainproof layer (70) are stacked on the protective layer A (10A) in that order. In the polarizer plate shown in FIG. 3(b), since the hard coating layer has a high refractive index, the high-refractive-index hard coating layer (55) is formed which allows the hard coating layer to function as the high-refractive-index layer.

In a polarizer plate (100C) shown in FIG. 3(c), a primer layer (40), a hard coating layer (50), a high-refractive-index layer (60b), and a low-refractive-index stainproof layer (75) are stacked on the protective layer A (10A) in that order. In the polarizer plate shown in FIG. 3(c), since the stainproof layer has a low refractive index, the low-refractive-index stainproof layer (75) is formed which allows the stainproof layer to function as the low-refractive-index layer.

In a polarizer plate (100D) shown in FIG. 4(d), a hard coating layer (50), an antireflective layer (60), and a stainproof layer (70) are stacked on the protective layer A (10A) in that order. In the polarizer plate shown in FIG. 4(d), the primer layer is omitted by increasing the interlayer adhesion by subjecting the surface of the protective layer A to surface modification.

In a polarizer plate (100E) shown in FIG. 4(e), a high-refractive-index hard coating layer (55) and a low-refractive-index stainproof layer (75) are stacked on the protective layer A (10A) in that order. In the polarizer plate shown in FIG. 4(e), the primer layer is omitted by increasing the interlayer adhesion by subjecting the surface of the protective layer A to surface modification, the hard coating layer is allowed to function as the high-refractive-index layer, and the stainproof layer is allowed to function as the low-refractive-index layer.

In a polarizer plate (100F) shown in FIG. 4(f), a low-refractive-index stainproof layer (75) is stacked on the protective layer A (10A). In the polarizer plate shown in FIG. 4(f), the primer layer is omitted by increasing the interlayer adhesion by subjection the surface of the protective layer A to surface modification, the protective layer A is allowed to function as the hard coating layer and the high-refractive-index layer, and the stainproof layer is allowed to function as the low-refractive-index layer.

The polarizer plate of the present invention is not limited to the configurations shown in FIG. 2, FIGS. 3(a) to 3(c), and FIGS. 4(d) to 4(f). The polarizer plate of the present invention may have various layer configurations without departing from the spirit and the scope of the present invention. According to the polarizer plates (100B) to (100F) shown in FIGS. 3(b), 3(c), and 4(d) to 4(f), particularly the polarizer plates (100E) and (100F) shown in FIGS. 4(e) and (f), since the number of layers stacked can be reduced, the thickness of the polarizer plate can be reduced, and the production cost can be significantly reduced.

2) Liquid Crystal Display Device

A liquid crystal display device of the present invention includes a light source, an incident-side polarizer plate, a liquid crystal cell, and an exit-side polarizer plate, wherein the incident-side polarizer plate and/or the exit-side polarizer plate is the polarizer plate of the present invention.

The liquid crystal display device of the present invention may include a light source, an incident-side polarizer plate, a liquid crystal cell, and an exit-side polarizer plate in that order, wherein only the incident-side polarizer plate may be the polarizer plate of the present invention, only the exit-side polarizer plate may be the polarizer plate of the present invention, or the incident-side polarizer plate and the exit-side polarizer plate may be the polarizer plates of the present invention.

It is preferable that only the exit-side polarizer plate be the polarizer plate of the present invention or the incident-side polarizer plate and the exit-side polarizer plate be the polarizer plates of the present invention.

In the liquid crystal display device of the present invention, it is preferable that the incident-side polarizer plate and/or the exit-side polarizer plate is the polarizer plate of the present invention, and the polarizer plate be disposed so that the layer a does not face the liquid crystal cell.

The liquid crystal display device of the present invention may be formed to have a transmission or reflection structure in which the polarizer plate of the present invention is disposed on one side or each side of the liquid crystal cell, or an appropriate known structure such as a semi-transmission structure. In the present invention, stretching (orientation) for providing a transparent resin layer with birefringence must be selectively performed corresponding to the liquid crystal mode used for the liquid crystal cell.

FIG. 5 shows part of a layer configuration example of a liquid crystal display device including the polarizer plate of the present invention. The liquid crystal display device shown in FIG. 5 includes a light source (not shown), a polarizer plate (110) as an incident-side polarizer plate, a retardation plate (120), a liquid crystal cell (130), and a polarizer plate (100) as an exit-side polarizer plate in order from the bottom. In this embodiment, the polarizer plate of the present invention is used as the polarizer plate (100). The polarizer plate (100) is bonded to the liquid crystal cell (130) through an adhesive or pressure-sensitive adhesive layer (not shown). As shown in FIG. 6, the liquid crystal cell (130) is formed by disposing two electrode substrates 150 provided with a transparent electrode (140) at a specific interval so that the transparent electrodes (140) face each other, and sealing a liquid crystal (160) in the space between the transparent electrodes (140), for example. In FIG. 6, a reference numeral 170 indicates a sealing material.

The liquid crystal mode of the liquid crystal (160) is not particularly limited. As examples of the liquid crystal mode, an in-plane switching (IPS) mode, a vertical alignment (VA) mode, a multi-vertical alignment (MVA) mode, s continuous pinwheel alignment (CPA) mode, a twisted nematic (TN) mode, a super-twisted nematic (STN) mode, a hybrid aligned nematic (HAN) mode, an optical compensated bend (OCB) mode, and the like can be given.

The liquid crystal display device shown in FIG. 5 may be used in a normally white mode in which a bright display occurs at a low applied voltage and a dark display occurs at a high applied voltage and a normally black mode in which a dark display occurs at a low applied voltage and a bright display occurs at a high applied voltage.

When providing a polarizer plate or an optical element on each side of the liquid crystal cell, the polarizer plates or the optical elements may be the same or different. When forming the liquid crystal display device, an appropriate element such as a luminance increasing film, a prism sheet, a lens array sheet, a light-guiding plate, a diffuser plate, or a backlight may be disposed at an appropriate position in one or more layers.

Since the liquid crystal display device of the present invention includes the polarizer plate of the present invention which exhibits excellent tenacity and surface hardness, the liquid crystal display device exhibits excellent tenacity and surface hardness. A liquid crystal display device including a polarizer plate of which the protective layer A has a water vapor transmission rate of 10 g/day·m$^2$ or less exhibits excellent durability.

EXAMPLES

The present invention is described below in more detail by way of examples and comparative examples. Note that the present invention is not limited to the following examples.

(1) Material

Resin a:

Polymethyl methacrylate (hereinafter abbreviated as "PMMA", Acrypet VH001 manufactured by Mitsubishi Rayon Co., Ltd.)

Polystyrene (hereinafter abbreviated as "PS", Toyo Styrol GP. G320C manufactured by Toyo-Styrene Co., Ltd.)

Resin b:

Norbornene resin (hereinafter abbreviated as "NB", ZEONOR 1060 manufactured by Zeon Corporation)

Polycarbonate resin (hereinafter abbreviated as "PC", Panlite K-1300Y and manufactured by Teijin Chemicals Ltd.)

Triacetyl cellulose (hereinafter abbreviated as "TAC", thickness: 40 μm, KC40X2M and manufactured by Konica Minolta)

Adhesive layer:
Ethylene-vinyl acetate copolymer (hereinafter abbreviated as "EVA1", EVAFLEX manufactured by Du pont-Mitsui Polychemicals Co., Ltd.)
Modified ethylene-vinyl acetate copolymer (hereinafter abbreviated as "EVA2", Mitsubishi Modic AP543 manufactured by Mitsubishi Chemical Corporation)

(2) Measurement of Flexural Modulus

The flexural moduli of the layers a and b of the protective layer A were measured in accordance with JIS K7171 using a tensile tester (autograph AG-100kNIS manufactured by Shimadzu Corporation).

(3) Measurement of Water Vapor Transmission Rate (WVTR)

The WVTR was measured in accordance with JIS K7209.

Example 1

(1) Production of Transparent Film (A1) Forming Protective Layer A

PMMA was supplied to a hopper provided to a double-flight 50-mm single-screw extruder (ratio of screw effective length L to screw diameter D (L/D)=28) equipped with a leaf-disk polymer filter with a pore diameter of 10 μm. The molten resin was supplied to a multi-manifold die with a die lip surface roughness Ra of 0.1 μm at an extruder exit temperature of 260° C. and an extruder gear pump rotational speed of 12 rpm.

NB was supplied to a double-flight 50-mm single-screw extruder (L/D=30) equipped with a leaf-disk polymer filter with a pore diameter of 10 μm. The molten resin was supplied to a multi-manifold die with a die lip surface roughness Ra of 0.1 μm at an extruder exit temperature of 260° C. and an extruder gear pump rotational speed of 6 rpm.

The molten PMMA (layer a), NB (layer b), and EVA (adhesive layer=layer x) were discharged from the multi-manifold die at 260° C. and cast onto a chill roll of which the temperature was adjusted at 130° C. The products were caused to pass through a chill roll of which the temperature was adjusted at 50° C. to obtain a coextruded transparent film (A1) with a width of 600 mm and a thickness of 80 μm formed of layer a (20 μm)-layer x (4 μm)-layer b (32 μm)-layer x (4 μm)-layer a (20 μm).

(2) Production of Transparent Film (B) Forming Protective Layer B

A norbornene resin film (ZeonorFilm ZF-14-100 manufactured by Zeon Corporation, thickness: 100 μm) was simultaneously biaxially stretched using a simultaneous biaxial stretching machine at an oven temperature (preheating temperature, stretching temperature, and thermosetting temperature) of 136° C., a longitudinal stretching factor of 1.41, and a horizontal stretching factor of 1.41 to obtain a stretched film with a thickness of 89 μm. The retardations (Re) and (Rth) of the resulting stretched film were 20 nm and 300 nm, respectively. This stretched film (transparent film (B)) was used as the protective layer B.

The in-plane retardation (Re) was measured as follows.

Specifically, the in-plane retardation (Re) was calculated by Re=(nx−ny)×d (nx and ny indicate the in-plane main refractive indices of the film, and d indicates the thickness of the film (nm)).

The retardation (Rth) in the direction of the thickness of the film was calculated by Rth=((nx+ny)/2−nz)×d (nx and ny indicate the in-plane main refractive indices of the film, nz indicates the refractive index in the direction of the thickness of the film, and d indicates the thickness of the film (nm)).

The refractive indices (nx, ny, nz) were measured five times at five arbitrary places in the film plane using an automatic birefringence meter (KOBRA-21ADH manufactured by Oji Scientific Instruments), the retardations (Re, Rth) were calculated using the measurement results, and the average value of the calculation results was taken as the representative retardation.

The variation in retardation (ΔR) may be calculated by the following expression (1) or (2). The largest value obtained by the expressions (1) and (2) was taken as the variation in retardation (ΔR). R indicates the representative retardation, Rmin indicates the minimum retardation, and Rmax indicates the maximum retardation.

$$\Delta R=(R-R\min)/R\times 100(\%) \quad (1)$$

$$\Delta R=(R-R\max)/R\times 100(\%) \quad (2)$$

As a result of measurement, the variations in retardations (Re) and (Rth) were within 2%, respectively.

(3) Production of Polarizer

A polyvinyl alcohol film (Kuraray Vinylon #7500 manufactured by Kuraray Co., Ltd.) with a thickness of 75 μm was secured using a chuck and immersed in an aqueous solution of iodine (0.2 g/L) and potassium iodide (30 g/L) while subjecting the film to a boric acid treatment for five minutes with uniaxial stretching by a factor of 6.0. The film was dried at room temperature for 24 hours to obtain a polarizer. The degree of polarization was 99.995%.

(4) Surface Treatment of Transparent Film (A1) and Transparent Film (B)

The surfaces of the protective layers A and B were subjected to a corona discharge treatment for three seconds using a high-frequency generator (Corona Generator HV05-2 manufactured by Tamtec) at an output voltage of 100% and an output of 250 W utilizing a wire electrode with a diameter of 1.2 mm (length of electrode: 240 mm, distance between electrodes: 1.5 mm).

(5) Production of Polarizer Plate

The polarizer was bonded to the surface of the protective layer A subjected to the surface treatment through an acrylic adhesive (DP-8005 Clear manufactured by Sumitomo 3M), and the surface of the protective layer B subjected to the surface treatment was bonded to the other surface of the polarizer through an acrylic adhesive (DP-8005 Clear manufactured by Sumitomo 3M) to obtain a polarizer plate.

(6) Installation of Polarizer Plate in LCD Monitor

A polarizer plate and a viewing angle compensation film provided on either side of a liquid crystal cell were removed from a commercially-available LCD monitor (20 V liquid crystal monitor, TN mode, OCB mode, VA mode, MVA mode, and IPS mode), and the polarizer plate 1 obtained as described above was bonded to obtain an evaluation monitor.

Example 2

A coextruded transparent film (A2) with a width of 600 mm and a thickness of 100 μm formed of layer a (20 μm)-layer x (4 μm)-layer b (52 μm)-layer x (4 μm)-layer a (20 μm) was obtained in the same manner as in Example 1 except for using PS as the resin a instead of PMMA. A polarizer plate was produced and installed in a liquid crystal monitor in the same manner as in Example 1.

Example 3

A coextruded transparent film (A3) with a width of 600 mm and a thickness of 100 μm formed of layer a (30 μm)-layer x (4 μm)-layer b (66 μm) was obtained in the same manner as in Example 1 instead of a five-layer transparent film formed of three types of layers. A polarizer plate was produced and installed in a liquid crystal monitor in the same manner as in Example 1 so that the layer a was disposed on the viewer side.

Example 4

A coextruded transparent film (A4) with a width of 600 mm and a thickness of 80 μm formed of layer a (20 μm)-layer x (4 μm)-layer b (32 μm)-layer x (4 μm)-layer a (20 μm) was obtained in the same manner as in Example 1 except for using PC as the resin b instead of NB. A polarizer plate was produced and installed in a liquid crystal monitor in the same manner as in Example 1.

Example 5

In Example 1, TAC was used as the resin b instead of NB. A 10-wt % toluene solution of EVA2 was applied to each side of the TAC film so that the thickness after drying was 3 μm. A PMMA film with a thickness of 20 μm was pressure-laminated on each side of the TAC film to obtain a transparent film (A5) with a width of 600 mm and a thickness of 86 μm formed of layer a (20 μm)-layer x (3 μm)-layer b (40 μm)-layer x (3 μm)-layer a (20 μm).

A polarizer plate was produced and installed in a liquid crystal monitor in the same manner as in Example 1.

Comparative Example 1

A single-layer transparent film (A6) formed of PMMA and having a thickness of 100 μm was obtained as the protective layer A. A polarizer plate was produced and installed in a liquid crystal monitor in the same manner as in Example 1.

Comparative Example 2

A single-layer film transparent film (A7) formed of NB and having a thickness of 100 μm was obtained as the protective layer A. A polarizer plate was produced and installed in a liquid crystal monitor in the same manner as in Example 1.

Tenacity and Surface Hardness Evaluation Test (1) Scratch Visibility Test

The surface hardness of the service side (layer a) of the stacked film of the polarizer plate obtained in each of Examples 1 to 5 and Comparative Examples 1 and 2 was measured in accordance with J15 K5600 at a load of 250 g using a pencil with a hardness of 2H.

The polarizer plate after measurement was disposed in the liquid crystal monitor, and the liquid crystal monitor was caused to display a white screen. The screen was diagonally observed at an angle of 45°. A case where pencil scratches were not observed was evaluated as "Good", and a case where pencil scratches were observed was evaluated as "Bad".

(2) Flexibility Evaluation Test

Figure 7:
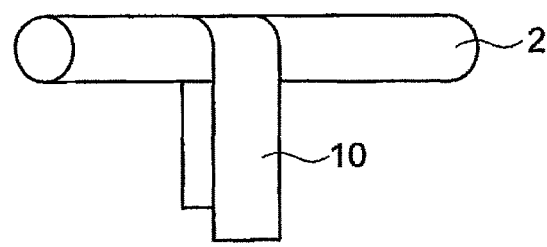
FIG. 7 is a view showing a flexibility evaluation test method.

Each of the transparent films (A1) to (A7) (protective layer A) obtained in Examples 1 to 5 and Comparative Examples 1 and 2 was punched to 1 cm×5 cm to obtain a sample film. As shown in FIG. 7, the resulting sample film (10) was wound around a steel rod (2) with a diameter of 3 mm, and whether or not the wound film (10) broke around the rod (2) was determined. The tests were conducted ten times, and the total number of tests in which the sample film did not break was taken as the flexibility index.

Table 1 shows the types of resins a and b forming the layer a, the flexural moduli of the layers a and b, the type of adhesive resin forming the adhesive layer (layer x), the layer configuration (thickness), and the WVTR of each of the transparent films (A1) to (A5) obtained in Examples 1 to 5 and the transparent films (A6) and (A7) obtained in Comparative Examples 1 and 2. Table 1 also shows the scratch visibility test evaluation results and the flexibility evaluation test results.

TABLE 1

|  | Example 1 | Example 2 | Example 3 | Example 4 | Example 5 | Comparative Example 1 | Comparative Example 2 |
|---|---|---|---|---|---|---|---|
| Resin a | PMMA | PS | PMMA | PMMA | PMMA | PMMA | NB |
| Flexural modulus of layer a (GPa) | 3.3 | 3.3 | 3.3 | 3.3 | 3.3 | 3.3 | 2.1 |
| Resin b | NB | NB | NB | PC | TAC | None | None |
| Flexural modulus of layer b (GPa) | 2.1 | 2.1 | 2.1 | 2.4 | 2.4 | — | — |
| Adhesive layer (layer x) | EVA1 | EVA1 | EVA1 | EVA1 | EVA2 | None | None |
| Layer configuration (thickness) | a/x/b/x/a | a/x/b/x/a | a/x/b | a/x/b/x/a | a/x/b/x/a | a | a |
| (μm) | 20/4/32/4/20 | 20/4/52/4/20 | 30/4/66 | 20/4/32/4/20 | 20/3/40/3/20 | 100 | 100 |
| Transparent film | A1 | A2 | A3 | A4 | A5 | A6 | A7 |
| WVTR (g/day · m$^2$) | 4.0 | 3.5 | 3.2 | 6.0 | 9.0 | 14.0 | 1.5 |
| Scratch visibility test | Good | Good | Good | Good | Good | Good | Bad |
| Flexibility evaluation test | 10 | 10 | 10 | 10 | 10 | 1 | 10 |

As shown in Table 1, the liquid crystal display devices (Examples 1 to 5) including the polarizer plate in which the stacked film (transparent films (A1) to (A5)) formed of the layer a having a relatively high flexural modulus and the layer b having a relatively low flexural modulus was the protective layer A exhibited excellent results in the scratch visibility test and the flexibility evaluation test. Therefore, it was found that these liquid crystal display devices were provided with a polarizer plate exhibiting high tenacity and high surface hardness.

On the other hand, the liquid crystal display device (Comparative Example 1) including the polarizer plate in which the transparent film (A6) formed only of PMMA having high surface hardness was the protective layer A exhibited excellent results in the scratch visibility test, but exhibited poor results in the flexibility evaluation test (i.e. the polarizer plate exhibited poor tenacity). The liquid crystal display device (Comparative Example 2) including the polarizer plate in which the transparent film (A7) formed only of NB having low surface hardness was the protective layer A exhibited excellent results in the flexibility evaluation test, but exhibited poor results in the scratch visibility test (i.e. the polarizer plate exhibited low surface hardness).

The transparent films (A1) to (A5) obtained in Examples 1 to 5 had a WVTR of 10 g/day·m$^2$ or less to exhibit excellent moisture resistance. Therefore, a polarizer plate using the transparent films (A1) to (A5) and a liquid crystal display device including the polarizer plate also exhibit excellent durability.

(3) Liquid Crystal Display Performance Evaluation Test

A liquid crystal display panel was removed from a commercially-available LCD monitor (20 V liquid crystal monitor, TN mode, OCB mode, VA mode, MVA mode, and IPS mode). A polarizer plate and a viewing angle compensation film provided on a liquid crystal cell on the viewer side were removed, and the polarizer plate obtained in each of Examples 1 to 5 and Comparative Examples 1 and 2 was provided on the liquid crystal cell. The liquid crystal display panel was caused to display white characters on a black background. The line of sight was moved from the front in the vertical and horizontal directions, and the angle at which the white characters could not be read was measured.

The measurement results are shown in Table 2.

(4) Color Nonuniformity Evaluation Test

The liquid crystal display device prepared for the liquid crystal display performance evaluation test was cause to display a black screen and allowed to stand at a temperature of 60° C. and a humidity of 90% for 300 hours. The entire black display screen was observed from the front in a darkroom, and evaluated according to the following criteria.

Good: A uniform black display is formed over the entire screen without leakage of light.
Fair: Color nonuniformity of black display is observed at the top, bottom, right, and left of the frame.
Bad: Leakage of light is observed at the top, bottom, right, and left of the frame.

The evaluation results are shown in Table 2.

(5) Bright Point Evaluation Test

The liquid crystal display device prepared for the liquid crystal display performance evaluation test was cause to display a black screen and allowed to stand at a temperature of 60° C. and a humidity of 90% for 300 hours. The entire display screen was observed from the front in a darkroom, and the number of bright points was counted. The results are shown in Table 2.

TABLE 2

| | Liquid crystal mode | Viewing angle Vertical (°) | Viewing angle Horizontal (°) | Color nonuniformity evaluation | Bright point evaluation (number) |
|---|---|---|---|---|---|
| Example 1 | TN | 55 | 100 | Good | 0 |
| Example 2 | | 60 | 90 | Good | 0 |
| Example 3 | | 55 | 90 | Good | 0 |
| Example 4 | | 55 | 90 | Good | 0 |
| Example 5 | | 50 | 90 | Good | 0 |
| Comparative Example 1 | | 50 | 80 | Fair | 15 |
| Comparative Example 2 | | 50 | 80 | Fair | 25 |
| Example 1 | OCB | 65 | 90 | Good | 0 |
| Example 2 | | 70 | 80 | Good | 0 |
| Example 3 | | 65 | 85 | Good | 0 |
| Example 4 | | 65 | 80 | Good | 0 |
| Example 5 | | 65 | 80 | Good | 0 |
| Comparative Example 1 | | 55 | 70 | Fair | 10 |
| Comparative Example 2 | | 60 | 75 | Fair | 15 |
| Example 1 | VA | 90 | 100 | Good | 0 |
| Example 2 | | 85 | 95 | Good | 0 |
| Example 3 | | 85 | 95 | Good | 0 |
| Example 4 | | 85 | 95 | Good | 0 |
| Example 5 | | 85 | 95 | Good | 0 |
| Comparative Example 1 | | 75 | 85 | Fair | 7 |
| Comparative Example 2 | | 70 | 80 | Fair | 15 |
| Example 1 | MVA | 35 | 120 | Good | 0 |
| Example 2 | | 40 | 110 | Good | 0 |
| Example 3 | | 35 | 120 | Good | 0 |
| Example 4 | | 40 | 120 | Good | 0 |
| Example 5 | | 40 | 120 | Good | 0 |
| Comparative Example 1 | | 25 | 100 | Fair | 20 |
| Comparative Example 2 | | 25 | 100 | Fair | 15 |
| Example 1 | IPS | 60 | 130 | Good | 0 |
| Example 2 | | 65 | 130 | Good | 0 |
| Example 3 | | 60 | 125 | Good | 0 |
| Example 4 | | 60 | 130 | Good | 0 |
| Example 5 | | 60 | 130 | Good | 0 |
| Comparative Example 1 | | 50 | 120 | Fair | 17 |
| Comparative Example 2 | | 50 | 120 | Fair | 12 |

As shown in Table 2, the liquid crystal display devices obtained using the polarizer plates of Examples 1 to 5 exhibited excellent viewing angle characteristics in comparison with the liquid crystal display devices obtained using the polarizer plates of Comparative Examples 1 and 2 irrespective of the liquid crystal mode. Even after being allowed to stand at a high temperature and a high humidity for a long time (300 hours), the liquid crystal display devices obtained using the polarizer plates of Examples 1 to 5 showed a small degree of color nonuniformity and did not produce bright points.

On the other hand, the liquid crystal display devices obtained using the polarizer plates of Comparative Examples 1 and 2 exhibited viewing angle characteristics equal to or inferior to the liquid crystal display devices obtained using the polarizer plates of the examples in all liquid crystal modes used in the test. The liquid crystal display devices obtained using the polarizer plates of Comparative Examples 1 and 2 showed color nonuniformity and produced bright points after being allowed to stand at a high temperature and a high humidity for a long time (300 hours).

INDUSTRIAL APPLICABILITY

According to the present invention, a polarizer plate having a polarizer protection function and exhibiting excellent tenacity and surface hardness and a liquid crystal display device including the polarizer plate are provided.

The polarizer plate of the present invention in which the protective layer A has a water vapor transmission rate of 10 g/day·m² or less and the liquid crystal display device including the polarizer plate also exhibit excellent durability.

The invention claimed is:

1. A polarizer plate comprising at least a protective layer A, a polarizer, and a protective layer B in that order,
   the protective layer A including at least layers a and b respectively including a thermoplastic resin as a main component,
   the layer a being formed of at least one kind of resin selected from the group consisting of a vinyl aromatic polymer, a poly(meth)acrylate polymer, a polyacrylonitrile polymer, a vinyl alicyclic hydrocarbon polymer, and a hydrogenated product thereof,
   the layer b having a thickness of 5 to 52 μm and being formed of at least one kind of resin selected from the group consisting of an alicyclic structure-containing polymer, a cellulose polymer, a polyester polymer, a polycarbonate polymer, a polysulfone polymer, a polyethersulfone polymer, a vinyl chloride polymer, and a poly(meth)acrylate polymer, the flexural modulus of the layer b being 2.1 to 3GPa, and
the flexural modulus of layer a being higher than the flexural modulus of layer b.

2. The polarizer plate according to claim 1, wherein the protective layer A has a water vapor transmission rate of 10 g/day·m² or less.

3. The polarizer plate according to claim 1, wherein the protective layer B is a layer exhibiting birefringence.

4. A liquid crystal display device comprising a light source, an incident-side polarizer plate, a liquid crystal cell, and an exit-side polarizer plate in that order, wherein the incident-side polarizer plate and/or the exit-side polarizer plate is the polarizer plate according to claim 1.

5. A liquid crystal display device comprising a light source, an incident-side polarizer plate, a liquid crystal cell, and an exit-side polarizer plate in that order, wherein the exit-side polarizer plate is the polarizer plate according to claim 1.

6. A liquid crystal display device comprising a light source, an incident-side polarizer plate, a liquid crystal cell, and an exit-side polarizer plate in that order, wherein the incident-side polarizer plate and/or the exit-side polarizer plate is the polarizer plate according to claim 1, and wherein the polarizer plate according to claim 1 is disposed so that the layer b is located closer to the liquid crystal cell than is the layer a.

7. The polarizer plate according to claim 1, wherein the protective layer A includes the layer a, the layer b, and a layer c.

8. The polarizer plate according to claim 7, wherein the layer b and the layer c are formed of a poly(meth)acrylate polymer.

9. The polarizer plate according to claim 1, wherein the layer b is provided adjacent to the polarizer.

10. The polarizer plate according to claim 1, wherein the thermoplastic resin is at least one thermoplastic resin selected from the group consisting of a vinyl aromatic polymer, a poly(meth)acrylate polymer, a polyacrylonitrile polymer, a vinyl alicyclic hydrocarbon polymer, and a hydrogenated product thereof.

11. The polarizer plate according to claim 1, where the layer b is formed by at least one thermoplastic resin selected from the group consisting of an alicyclic structure-containing polymer, a cellulose polymer, and a polyester polymer.

12. The polarizer plate according to claim 1, where the layer b is formed by at least one thermoplastic resin selected from the group consisting of an alicyclic structure-containing polymer, a cellulose polymer and a polycarbonate polymer.

13. The polarizer plate according to claim 1, where the protective layer A has a three-layer structure formed of the layers a, x, and b or a five-layer structure formed of the layers a, x, b, x, and a, wherein the layer x is an adhesive layer.

14. A polarizer plate comprising at least a protective layer A, a polarizer, and a protective layer B in that order,
the protective layer A including at least layers a and b respectively including a thermoplastic resin as a main component,
the layer a being formed of at least one kind of resin selected from the group consisting of a vinyl aromatic polymer, a poly(meth)acrylate polymer, a polyacrylonitrile polymer, a vinyl alicyclic hydrocarbon polymer, and a hydrogenated product thereof,
the layer b having a thickness of 52 μm or less and being formed of at least one kind of resin selected from the group consisting of an alicyclic structure-containing polymer, a cellulose polymer, a polyester polymer, a polycarbonate polymer, a polysulfone polymer, a polyethersulfone polymer, a vinyl chloride polymer, and a poly(meth)acrylate polymer,
the flexural modulus of the layer b is 2.1 to 3GPa, and
the flexural modulus of layer a being higher than the flexural modulus of layer b.

* * * * *